Nov. 6, 1923.
H. M. MYRACLE
MULTIPLE FISHING TOOL
Filed Aug. 19, 1922
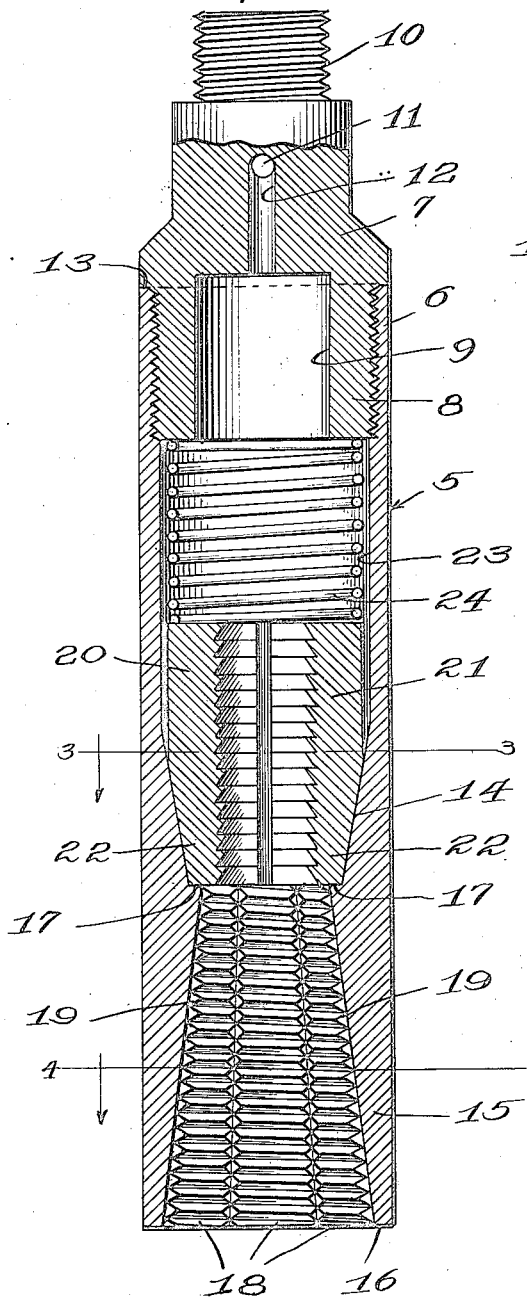
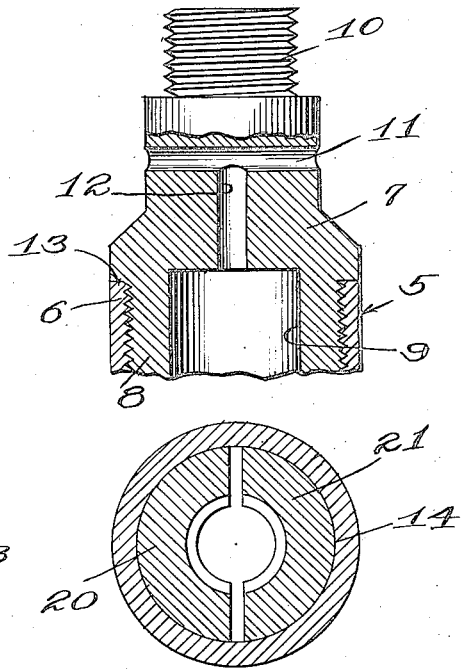
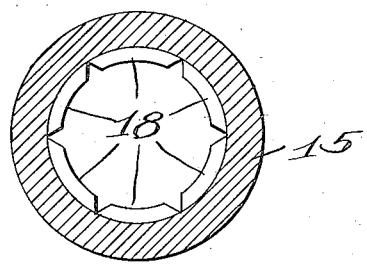
Inventor
H M Myracle
By Watson E. Coleman
Attorney Patented Nov. 6, 1923.

1,473,158

UNITED STATES PATENT OFFICE.

HOBART M. MYRACLE, OF HAYNESVILLE, LOUISIANA.

MULTIPLE FISHING TOOL.

Application filed August 19, 1922. Serial No. 582,996.

*To all whom it may concern:*

Be it known that I, HOBART M. MYRACLE, a citizen of the United States, residing at Haynesville, in the parish of Claiborne and State of Louisiana, have invented certain new and useful Improvements in Multiple Fishing Tools, of which the following is a specification, reference being had to the accompanying drawings.

This invention relates to fishing tools, and more particularly to a multiple fishing tool.

It is an object of the invention to provide a tool of this character capable of grasping several portions of a sucker rod according to the diameter of said portions.

It is another object of the invention to provide a device of this character arranged to receive the end of a broken sucker rod and its connections, and wherein at least one portion of the sucker rod will be held securely should the portion that first enters the device be broken from the remainder of the sucker rod.

It is a further object of the invention to provide a device of this character wherein sucker rods of different dimensions may not only be inserted in the tool, but wherein means are provided to prevent interference with the connection of the tool to the sucker rod by gas or like pressure means, which might accumulate within the socket of the tool.

With these and other objects in view, the invention consists in the improved construction and arrangement of parts to be hereinafter more particularly described, fully claimed and illustrated in the accompanying drawings, in which:—

Figure 1 is a longitudinal sectional view of a fishing tool constructed in accordance with an embodiment of the invention;

Figure 2 is a fragmentary transverse sectional view showing the outlet openings in the head of the tool;

Figure 3 is a section taken on the line 3—3 of Figure 1; and

Figure 4 is a section taken on the line 4—4 of Figure 1.

Referring to the drawings, 5 designates the body member of the tool, said body member being substantially tubular. The end portion 6 of the body member is internally threaded for the reception of a head 7, the end portion 8 of the head being reduced and exteriorly threaded for engagement with the threads of the end portion 7 of the body member, the end portion 8 of the head also having a recess 9. The opposite end portion 10 of the head is reduced and threaded for connection to means for actuating the tool.

The central portion of the head is provided with a transversely extending opening 11, while communicating with the opening 11 and extending through the head and communicating with the recess 9 is a passage 12. The communicating passages 11 and 12 permit the escape of gas and like pressure means that might accumulate within the recess 9 and which would undoubtedly interfere with the insertion of the sucker rod in the tool. A shoulder 13 is provided at the junction of the end portion 8 with the head 7, said shoulder being arranged to engage the end face of the end portion 7 of the body member. The recess 9 of the head is smaller in diameter than the diameter of the tubular body member adjacent the threads of the end 6, so that a portion of the end face of the extension 8 projects inwardly of the tubular member for a purpose to be hereinafter described.

The bore of the body member 5 adjacent to its longitudinal center is provided with a socket 14 tapering toward the axial center of the body member 5 and in a direction toward the end portion 15 of the body member. The end portion 15 also has its bore tapered, said taper being disposed inwardly thereof from the end face 16 of the member 5 with the inner end of said tapered portion of a diameter less than the diameter of the adjacent end of the adjacent socket 14 whereby an internal shoulder 17 is afforded to provide a seat. The wall of the bore of the tapered portion 15 of the member 5 is provided therearound with a spiral tooth 19 the convolutions of which being interrupted or fluted as at 18, said interruptions being preferably at points equi-distantly spaced around the wall of such bore.

Disposed within the body member and normally resting within the tapered socket 14 is a movable jaw member comprising jaw sections 20 and 21. Each section is substantially semi-circular and has the outer face of its end portion 22 tapered in accordance with the tapered socket 14, so that movement of the sections 20 and 21 toward the stationary jaw members will decrease the space between said sections.

By the cooperation of the head 7 and the movable jaw, a compartment 23 is provided, for the reception of an expansion spring 24. One inserted end of the spring engages the end of the head 7, while the opposite end of the spring engages the adjacent ends of the movable jaw members to normally urge the jaw members toward the internal shoulder 17.

In practice, the sucker rod is caused to enter within the tapered bore of the portion 15 of the member 5 and if the diameter of such portion of the rod is less than that of the inner end of said tapered bore, the rod will pass between the jaw sections 20 and 21 resulting in an upward movement of said jaw sections against the action of the spring 24, the resultant tension of the spring causing the teeth of the sections 20 and 21 to impinge or have sufficient frictional engagement with the rod whereby said rod is firmly locked within the body member. If the rod be broken off at a connection, the box or pin will not pass entirely through the tapered bore of the portion 15 of the member 5 but under such conditions, turning movement imposed on the body 5 will cause the threads 18 to impinge such portion of the rod and this action is further facilitated by the interruptions or flutes 18' as the same produces a plurality of entering points.

From the foregoing it will be readily seen that this invention provides a novel form of fishing tool capable of removing sucker rods of any dimension, and also capable of holding the sucker rod at various points according to the diameter of the rod and its connections. All of these features are possessed by a tool composed of only a few number of simple parts.

What is claimed is:—

1. A fishing tool comprising an elongated hollow body having the lower end of its bore tapered to define a socket, the smaller diameter of said socket being at the upper end thereof, the wall of said socket being provided therealong with a spiral tooth, a stop formed at the inner end of the tapered enlargement, that portion of the tubular body member inwardly of the stop being formed into a tapering socket, a movable sectional jaw disposed within said socket, and normally engaged with the stop, a detachable head having one end thereof reduced and threaded beyond the opposite end portion of the body member, said reduced end having a recess smaller in diameter than the diameter of the body member, said head member having a transversely extending passage in the outer end portion thereof, a second passage communicating with said passage and the recess of the head, and a coil spring engaged with the inner end face of the head and at its opposite end with the sections of the movable jaw.

2. A fishing tool comprising an elongated cylindrical body formed at its lower end with an upwardly tapering socket having the wall thereof formed with teeth arranged in groups, a stop shoulder at the top of said socket, said body being hollow and having its interior wall tapering upwardly and outwardly from its shoulder, a cap removably engaged within the upper end of the body and provided with suspension means, a movable sectional jaw member mounted within the body and normally seating upon said stop shoulder, the lower portion of the outer wall of said jaw member being tapered and conformingly engaging the tapered inner wall of the body, said jaw member being provided therealong with a tooth, and a spring engaging the cap and the jaw member for normally urging the latter into engagement with said shoulder.

3. A fishing tool comprising an elongated cylindrical body formed at its lower end with an upwardly tapering socket having the wall thereof formed with teeth arranged in groups, a stop shoulder at the top of said socket, said body being hollow and having its interior wall tapering upwardly and outwardly from its shoulder, a cap removably engaged within the upper end of the body and provided with suspension means, a movable sectional jaw member mounted within the body and normally seating upon said stop shoulder, the lower portion of the outer wall of said jaw member being tapered and conformingly engaging the tapered inner wall of the body, said jaw member being provided therealong with a tooth, and a spring engaging the cap and the jaw member for normally urging the latter into engagement with said shoulder, the convolutions of said tooth being interrupted.

In testimony whereof I hereunto affix my signature.

HOBART M. MYRACLE.